Sept. 5, 1961 L. H. THOMAS 2,999,229

SHIFT REGISTER USING SOLID STATE DEVICES

Filed Feb. 11, 1959 3 Sheets-Sheet 1

INVENTOR

Llwellyn H. Thomas

BY

Sughrue, Rothwell, Mion & Zinn

ATTORNEYS

LEGEND FOR FIG. 2

Sept. 5, 1961 L. H. THOMAS 2,999,229

SHIFT REGISTER USING SOLID STATE DEVICES

Filed Feb. 11, 1959 3 Sheets-Sheet 3

United States Patent Office 2,999,229 Patented Sept. 5, 1961

2,999,229

SHIFT REGISTER USING SOLID STATE DEVICES

Llewellyn H. Thomas, Leonia, N.J., assignor to International Business Machines Corporation, New York, N.Y., a corporation of New York Filed Feb. 11, 1959, Ser. No. 792,584
9 Claims. (Cl. 340—173.1)

This invention relates to register circuits using solid state circuit elements and in particular to a shift register using solid state circuit elements operated at low temperatures.

It has recently been discovered that a solid state material may be given new and unique physical characteristics by a combination of the control of the ingredients in the material and the environmental conditions under which it is to operate. For example, it has been found that germanium bars immersed in liquid helium possess properties not heretofore associated in the art with either conductors, non-conductors or semi-conductors. The mechanics of operation of such low temperature solid state devices are described particularly in the application by Seymour H. Koenig and Gerard R. Gunther-Mohr, Serial No. 739,855, filed June 4, 1958, and entitled Solid State Circuit Elements. These low temperature solid state circuit devices possess the particular unique characteristic that they may be switched from a condition of negligible conductance to a condition of significant conduction by exerting a minimum of external electrical control. This characteristic makes these devices particularly adaptable for use in registers or other storage agents used extensively in the computer and data processing field.

It is accordingly an object of this invention to provide an improved circuit for use in the computer and data-processing fields.

It is another object of this invention to provide a circuit which stores information by the conducting or non-conducting state of a low temperature solid state circuit device.

It is still further an object of this invention to provide an improved shift register circuit using low temperature solid state circuit devices.

It is still another object of this invention to provide a circuit wherein information can be shifted from one storage device to succeeding storage devices by external control of the voltages applied to low temperature solid state circuit devices.

Other objects of the invention will be pointed out in the following description and claims and illustrated in the accompanying drawings, which disclose, by way of example, the principle of the invention and the best mode which has been contemplated of applying that principle.

These and other objects are achieved in accordance with the invention by providing a crystalline material as a circuit device in a condition wherein essentially all of the carriers are confined to a lower, essentially non-conducting, energy state and carriers in controllable quantities may be confined or released from this state to the conduction energy level of the material through the application of an external voltage to the material. In the embodiment described, the solid state circuit devices are connected in series to form a shift register in which binary information is stored as the conducting or non-conducting state of each circuit device. External electrical control is exerted to shift the information stored in each circuit device to succeeding circuit devices in the series connected chain.

The solid state devices used in the subject invention may be germanium bars maintained at a very low environmental temperature. For example, if germanium bars having the dimensions 1 cm. x 1 mm. x 1 mm. are immersed in liquid helium they will have the following properties:

The breakdown voltage for such a bar, i.e., the voltage at which the bar will switch from negligible conduction to significant conduction, is 10 volts. At voltages less than 10 volts the bars have a resistivity of $10^7$ ohms. If a voltage of 10 volts or greater is applied across the bar, the bar will break down in less than $10^{-9}$ seconds so as to provide enough current to hold the voltage drop down at slightly more than 10 volts; the current drawn must be limited, so that the bar shall not overheat, to not more than .0004 amp. corresponding to a dissipation of .01 watt per $cm.^2$ of surface. This gives an effective resistance that must not be allowed to fall below 4,000 ohms, or the bar will heat up.

If the voltage across the bar is reduced below the breakdown value, while remaining in the same direction, the resistivity of the bar increases with time at an exponential rate inversely proportional to the fifth power of the field. For example, the time for doubling the resistivity when the voltage across the bar is just below the breakdown value of 10 volts is about $3\times10^{-6}$ seconds. If the voltage across the bar is reduced below zero, the resistivity regains the $10^7$ ohms value in less than $10^{-9}$ seconds. With 4 volts across the bar its resistance will increase by a factor of 1.25 in $10^{-3}$ seconds, and it is this condition that is provided in the embodiment here considered.

Figures 1, 2:
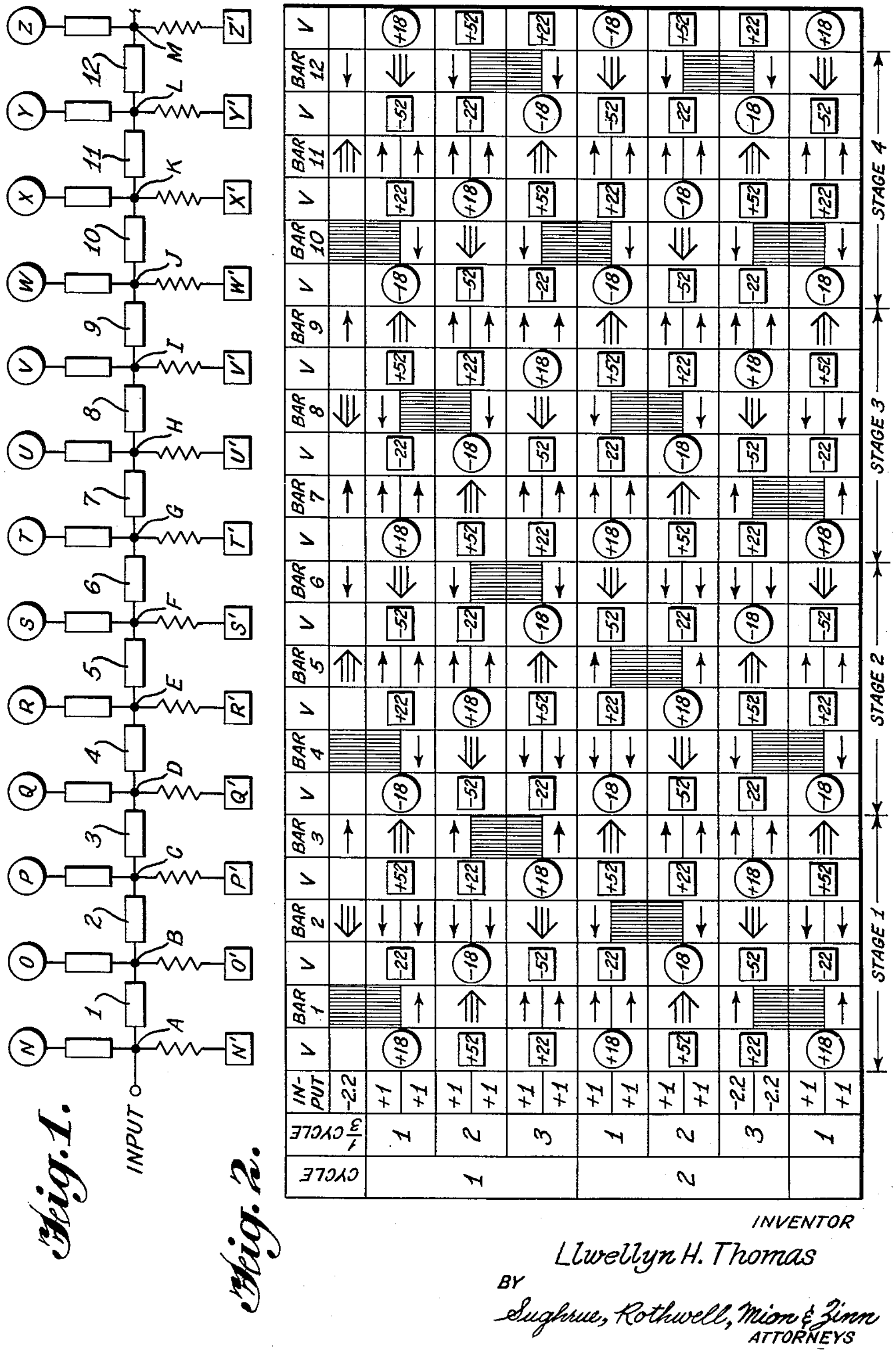
FIGURE 1 shows a plurality of low temperature solid state devices connected to form a shift register in accordance with one embodiment of the subject invention.
FIGURE 2 is a chart indicating the voltages applied to the solid state elements during the shift register cycles and the state of conduction or non-conduction of the solid state devices.
Figure 2A:
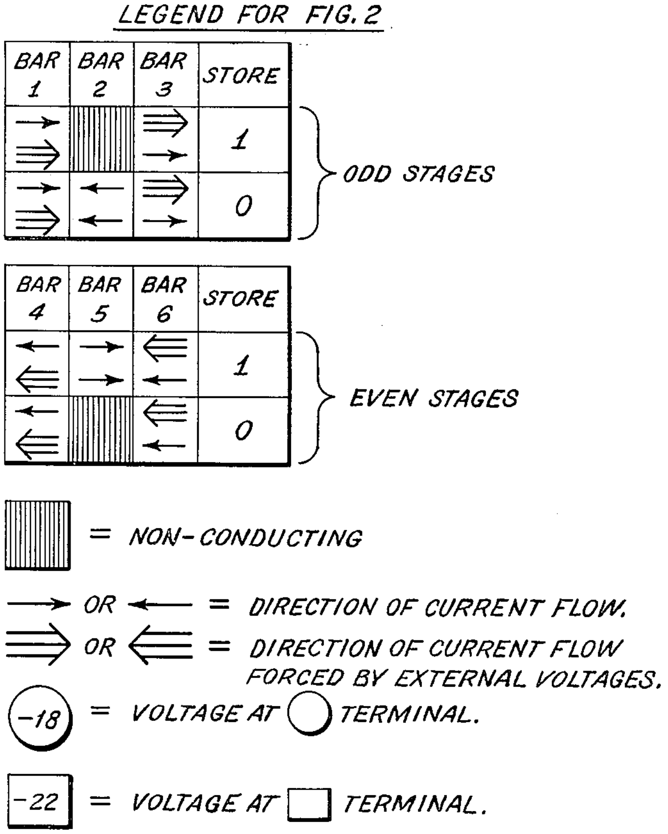
FIGURE 2A is a view illustrating the legend associated with FIGURE 2 and identifying the states of the individual bars at the end of the first one-third of a cycle and at the beginning of the second one-third of a cycle.

Referring to FIGURE 1, there is shown a plurality of the germanium bars, or devices, described above connected to form a shift register. The germanium bars, indicated as the rectangles 1, 2, 3, 4, etc., are connected in series. These bars store the binary information which is to be handled by the shift register. Similar germanium bars, indicated by the rectangles between the points N—A, O—B, P—C, etc., are connected to the junctions of the series connected bars. Similarly, 50,000 ohm resistors, shown as the resistors between the points, N'—A, O'—B, P'—C, etc., are also connected to the junctions of the series connected germanium bars.

The stages of the shift register are formed by groups of three adjacent series connected bars. Referring to FIGURE 1, the bars 1, 2 and 3 make up the first stage of the shift register; the bars 4, 5, and 6 make up the second stage of the shift register and so on. The twelve series connected bars shown in FIGURE 1 make up a four-stage shift register.

The shift register is operated by successively applying different predetermined voltages to the points N, O, P, Q, R, etc., and to the points S', O', P', Q', R', etc. During each cycle of the shift register operation, three different sets of voltages are applied to these points. During the first one third of the shift register cycle the point N is brought to +18 volts, the point Q is brought to —18 volts, the point T is brought to +18 volts and the point W is brought to —18 volts. During this same first period of a cycle the point O' is brought to —22 volts, the point P' is brought to +52 volts, the point R' is brought to +22 volts and the point S' is brought to —52 volts. During this period, successive sets of three bars in either direction have voltages of the same magnitude but of opposite polarity applied to the same relative points. In the embodiment under consideration, a complete cycle takes approximately $3 \times 10^{-8}$ seconds.

During the second one third of a cycle, voltages having the same magnitude, but opposite polarity are applied to points just one step to the right of the points to which they were applied during the first one third of a cycle. Similarly, during the third one third cycle, voltages equal in magnitude but of opposite polarity to those applied during the second one-third of a cycle are applied to points just one step to the right of the points to which the voltages were applied during the second one-third of a cycle.

The pattern of voltages which is applied to the shift register will later be explained more fully in connection with an explanation of the chart shown in FIGURE 2.

Figure 3:
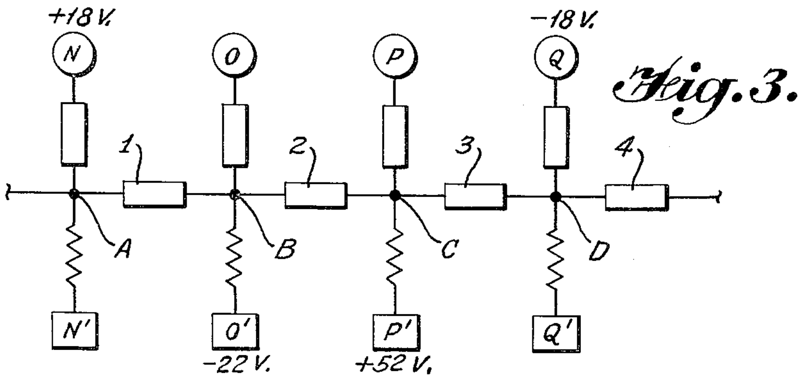
FIGURE 3 is a portion of the shift register circuit shown in FIGURE 1 with the voltages during one portion of the shift register cycle indicated.
Figure 4:
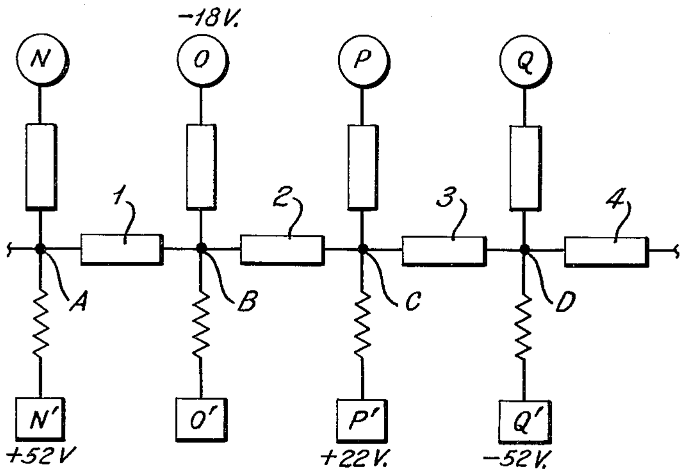
FIGURE 4 is the same portion of the shift register circuit of FIGURE 1 with the voltages during another portion of the shift register cycle indicated.
Figure 5:
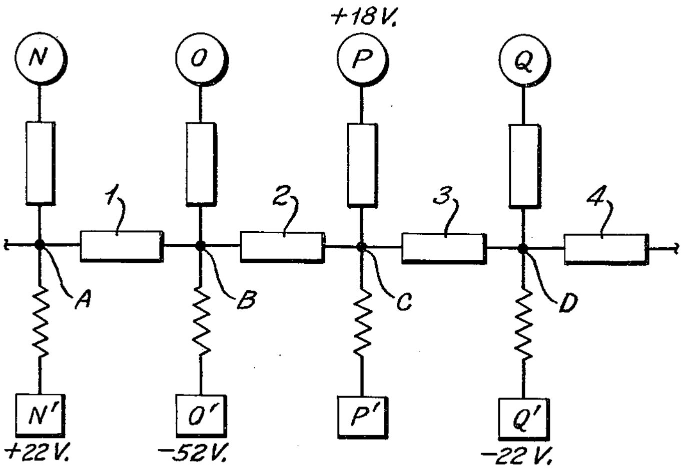
FIGURE 5 is the same portion of the shift register circuit of FIGURE 1 with the voltages during another portion of the shift register cycle indicated.

Before attempting a detailed explanation of the operation of the whole shift register shown in FIGURE 1, reference will be made to FIGURES 3, 4 and 5 showing a portion of the shift register and the voltages applied to this portion during one shift register cycle.

Referring to FIGURES 3, 4 and 5, there is shown the first stage of the shift register of FIGURE 1 (i.e., bars 1, 2 and 3 and associated circuits). FIGURE 3 shows the voltages applied to the points N, N', O, O', etc., during the first one-third of a shift register cycle. FIGURE 4 shows the voltages applied to the points N, N', O, O', etc., during the second one-third of a shift register cycle. FIGURE 5 shows the voltages applied to the points N, N', O, O', etc., during the third one-third of a shift register cycle.

Referring particularly to FIGURE 3, it should be observed that the voltage difference of 70 volts between the points P' and Q in the first one-third of the shift register cycle is sufficient to render bar 3 conducting in the direction CD and to render the bar between the points D and Q conducting in the direction DQ so that the point D assumes a voltage of —8 volts and the point C assumes a voltage of +2 volts. Since bar 3 will always become conducting under these conditions, the bars of the shift register to the left of bar 3 are isolated from the bars of the shift register to the right of bar 3.

Similarly, in the second one-third of the cycle, as indicated in FIGURE 4, the bars 1 and 4 each have a voltage across them which is sufficient to render them conducting. Bars 1 and 4 will isolate all bars to the left and right of each of those bars. In the third one-third of the cycle, as indicated in FIGURE 5, bar 2 has a voltage across it which is sufficient to render it conducting, and all bars to the left of bar 2 will be isolated from those bars to the right of bar 2.

Entry of data to the first stage of the register is from a 10,000 ohm line on which there is normally a signal of +1 volt. A —2.2 volts at the end of this line during the last one-third of a cycle will cause a signal to be entered into the first stage of the shift register. If there is no pulse, if, that is, a signal on the line remains at +1 volt, no entry will be made into the shift register.

Considering first the situation in which no entry is to be made in the first stage of the shift register, during the third one-third of the cycle, with the pattern of voltages as shown in FIGURE 5, the point B assumes a voltage of —2 volts, and bar 1 starts conducting in direction AB with a resistance of 10,000 ohms. Since the voltage drop across bar 1 is not sufficient to maintain complete conduction, the resistance of bar 1 begins to rise at a rate which would bring the resistance of bar 1 to 12,500 ohms in $10^{-8}$ seconds. However, the time occupied by one-third of a cycle is no longer than this period of time, so that bar 1 is left conducting in direction AB with a resistance no greater than 12,500 ohms at the end of the third one-third of a cycle. At this time, the remainder of the current going from point B to the point O', i.e., .001 amp., is provided by current flowing through bar 2, which has a resistance of 16,667 ohms and is conducting in the direction CB.

Next consider the first one-third of the shift register cycle with the voltage pattern as indicated in FIGURE 3. With this pattern of applied voltages, A is assumed a voltage of +8 volts, C a voltage of +2 volts and D a voltage of —8 volts. Moreover, bar 1 is initially conducting with a resistance no greater than 12,500 ohms in the direction AB; this was the condition of bar 1 at the end of the previous cycle as described above. Bar 2 is initially conducting with a resistance greater than 10,000 ohms in the direction CB. The point C cannot rise above +2 volts, and the point B rises above +2 volts, so that bar 2 must become non-conducting and bar 3 must break down to conduct with a resistance of 10,000 ohms in the direction CD.

Going on to the second one-third of the cycle with the pattern of voltages as indicated in FIGURE 4, the point B assumes a voltage of —8 volts and the point D assumes a voltage of —2 volts. Bar 2 is initially non-conducting and bar 3 is initially conducting in the direction CD with a resistance of 10,000 ohms. A current of .0004 amp. is supplied to point C by the +22 volts at point P', and this current goes through bar 3 which has a voltage drop across it of approximately 4 volts. The conditions assumed by bars 3 and 4 under these conditions will be the same as conditions assumed by bars 1 and 2 during the third one-third of a cycle previously described. Note that the conditions assumed by bars 1 and 2 during the third one-third of a cycle are now repeated two steps down the shift register in bars 3 and 4.

Consider now the situation in which an entry is to be made into the first stage of the shift register during the third one-third of the shift register cycle. The pattern of applied voltages will be that indicated in FIGURE 5. The point B assumes a voltage of —2 volts, and bar 1 starts conducting in the direction AB with a resistance of 10,000 ohms. However, the entry pulse of —2.2 volts at the end of the entry line is just sufficient for the line to carry off a current of .00048 amp. which is supplied to the point A by the voltage +22 volts at N' when point A is at —2 volts. Because of this, bar 1 becomes non-conducting while bar 2 must break down to conduct in the direction CB with a resistance of 10,000 ohms.

During the first one-third of the cycle, with the pattern of voltages as indicated in FIGURE 3, A assumes a voltage of +8 volts, D assumes —8 volts and C assumes +2 volts. Bar 1 is initially non-conducting, and bar 2 is initially conducting in the direction CB with a resistance of 10,000 ohms. The point B rises to —2 volts and the resistance of bar 2 increases, initially at a rate which would take it to 12,500 ohms in $10^{-8}$ seconds. Thus, bar 2 is left with a resistance no greater than 12,500 ohms while bar 3 has a resistance of 16,667 ohms and is conducting in the direction CD. These are the same conditions which existed at the end of the third one-third of a cycle in the situation in which no entry was made into the shift register as previously described. The operation of the shift register from this point on is the same as that previously described from that point on through the remainder of the cycle.

During each third of a cycle, the register is divided up into isolated parts by the bars that are forced to become conducting by the applied voltages. Of the two bars between isolating bars the one on the right is initially conducting because it was an isolating bar during the previous one-third of a cycle. The bar on the left is initially either non-conducting or conducting with a resistance of less than 12,500 ohms; in the former case, the bar on the right raises the resistance to no more than 12,500 ohms during this one-third of a cycle; in the latter case, it becomes non-conducting. Thus, the aid of the bar on the left is, during this third of a cycle, transferred in reverse to the bar on the right.

We may regard each successive set of three bars, 1, 2 and 3; 4, 5 and 6; and 7, 8 and 9, as forming a stage of the register. At the end of the first one-third of the cycle and the beginning of the second one-third of the cycle the conditions of the middle bars of each set, namely, bars 2, 5 and 8, determine the future state of the register; the left bars of the stages, namely, bars 1, 4 and 7, are just about to be made conducting by the applied voltages; the right bars of each of the stages, namely, bars 3, 6 and 9, have just been made conducting by the applied voltages. The bar 2 can at this time either be conducting or non-conducting. These two states may be regarded as defining a binary 1 or 0, respectively. The same is true for bars 8 and 14. Because the states of the bars are transferred into the next succeeding bar in reverse, it is convenient to define the information stored as a binary 0 or 1 for bars 5, 11, and so on according to whether they are conducting or not, respectively. At the end of the second one-third of the cycle, the information is stored in the bars 3, 6 and 9 and at the end of the third one-third of the cycle, information is stored in bars 1, 4 and 7. It is convenient to associate binary 1 or 0 with the conducting or non-conducting state respectively of even-numbered bars and a binary 0 or 1 with the conducting or non-conducting state respectively of all odd-numbered bars.

The operation of the shift register of FIGURE 1 can now be described in detail with reference to the chart of FIGURE 2. In the chart, the vertical columns indicate the voltages which are applied to the points on the shift register of FIGURE 1 directly above the column, and the horizontal rows indicate the portion of the shift register cycle. The circled numbers indicate the voltages at the unprimed points N, O, P, Q, etc., during the indicated portion of the register cycle, numbers contained in squares indicate voltages at the primed points N′, O′, P′, etc., during the indicated portions of the register cycle. The symbols indicate the space of the bars 1, 2, 3, etc., at the beginning and end of each one-third of a cycle. The column labelled "input" indicates the entry which is to be made in the first stage of the shift register that is the signal which is on the input line either +1 voltage for a "0" entry, or a −2.2 volts for a "1" entry.

The chart of FIGURE 2 shows the operation of the shift register of FIGURE 1 on the following problem. Initially, stage 1 contains a "1," and stages 2, 3 and 4 contain zeros. (This is indicated in the bottom half of the top row of FIGURE 2.) A zero, coming to the input during the third one-third of the first cycle, causes a binary 0 to appear in the first stage of the register at the end of the first one-third of the second cycle; a negative pulse coming into the input during the third one-third of the second cycle causes a binary 1 to appear in the first stage of the register at the end of the first third of the third cycle. Close study of the chart of FIGURE 2 will reveal how this information is shifted to subsequent shift register stages during the cycles. In studying this chart, reference need be made only to the pairs of bars between those held conducting by the external voltages. If the left-hand of these bars is conducting at the beginning of a third of a cycle, the right-hand bar is non-conducting at the end of that one-third of a cycle; and conversely, if the left-hand bar of the two is non-conducting at the beginning of a one-third of a cycle, the right-hand bar is conducting at the end of that one-third of a cycle.

We see that in each one-third of a cycle, the pattern of information is shifted to the right, one bar, and in a whole cycle, the pattern is shifted to the right, a whole stage of three bars, appearing, as defined, as the reverse condition of the middle bar of the previous stage during the one-third of the previous cycle.

Figure 6:
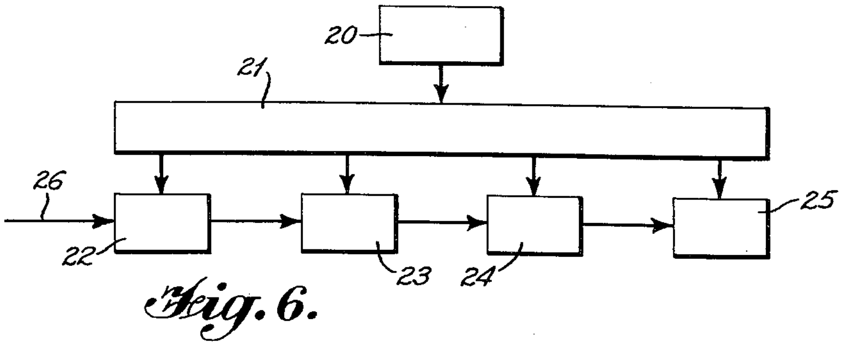
FIGURE 6 is a diagrammatic representation of the means of applying predetermined patterns of voltages to the various stages of the shift register constructed in accordance with this invention.

Referring now to FIGURE 6, numeral 20 indicates a voltage supply source which functions to supply to the various stages of the shift register potentials plus and minus 18 volts, plus and minus 22 volts and plus and minus 52 volts. These voltages are fed from the voltage supply unit 20 to the distributor 21. This distributor functions in any convenient fashion to apply the various positive and negative patterns of voltages to the terminals of the first, second, third and fourth stages of the shift register identified by numerals 22, 23, 24 and 25. Data is fed into the first stage of the shift register by the line 26. The line 26 will supply a pulse or the absence of a pulse to the first stage in accordance with the data which is to be inserted in the register.

While there have been shown and described and pointed out the fundamental novel features of the invention as applied to a shift register circuit, it will be understood that various omissions and substitutions and changes in the form and details of the circuit illustrated and in its operation may be made by those skilled in the art without departing from the spirit of the invention. It is the intention, therefore, to be limited only as indicated by the scope of the following claims.

What is claimed is:

1. A multi-stage shift register comprising a plurality of cascaded stages, each of said stages including a first group of series connected two-terminal solid state devices maintained at an environmental temperature whereby said devices are easily switched from the conducting to the non-conducting state, a second group of similar solid state devices maintained at said temperature having one of said terminals of each connected to each junction between the devices of said first group, a plurality of two-terminal impedances having one terminal of each connected to each of said junctions, each of said stages having first and second stable states defined by the states of conduction of said first group of devices, means to store information represented by one of said stable states in the first of said stages and means to shift said information to each succeeding stage, said last two-mentioned means comprising means to apply predetermined patterns of voltages to the second terminals of selected ones of said second group of devices and of selected ones of said impedances.

2. A shift register as defined by claim 1 wherein said impedances are resistors.

3. A shift register as defined by claim 1 wherein said devices are metallic bars having all current carriers therein confined to an energy level below the current conducting energy level of said bars.

4. A shift register as defined by claim 1 wherein said devices are three in number per group and each of said groups is connected in series.

5. A bistable storage element comprising a first group of series connected two-terminal solid state devices maintained at an environmental temperature whereby said devices are easily switched from the conducting to non-conducting state by reversing the voltage across them, a second group of similar devices maintained at said temperature having one terminal of each connected to each junction between the devices of said first group, and a plurality of two-terminal resistors having one terminal of each connected to each of said junctions.

6. A bistable storage element as defined by claim 5 further including means to apply first, second and third predetermined patterns of voltages to second terminals of selected ones of said second group of devices and of selected ones of said resistors to switch said element from one of said stable states to the other of said stable states.

7. A multi-stage shift register comprising a plurality of cascaded stages, each of said stages including a first group of series connected two-terminal solid state devices maintained at an environmental temperature whereby said devices are easily switched from the conducting to the nonconducting state, a second group of similar devices maintained at said temperature having one terminal of each connected to each conjunction between the devices of said first group, a plurality of two-terminal impedance having one terminal of each connected to each of said junctions, each of said stages having first and second stable states defined by the states of conduction of said first group of devices, means to store information represented by one of said stable states in the first of said stages and means to shift said information to each succeeding stage, said last two-mentioned means comprising means to apply predetermined patterns of voltages to the second terminals of selected ones of said second group of devices and of selected ones of said impedances.

8. A multi-stage shift register comprising a plurality of cascaded stages, each of said stages including a first group of three series connected two-terminal germanium bars having all current carriers therein confined to an energy level below the current conducting energy level of said bars, said bars being immersed in liquid helium whereby said devices are easily switched from the conducting to the nonconducting state, a second group of three two-terminal germanium bars maintained at liquid helium temperature having one of said terminals of each connected to each junction between the devices of said first group, each of said first groups being connected in series, a plurality of two-terminal resistors having one terminal of each connected to each of said junctions, each of said stages having first and second stable states defined by the states of conduction of said first group of devices, means to store information represented by one of said stable states in the first of said stages and means to shift information to each succeeding stage, said last two mentioned means comprising means to apply predetermined patterns of voltages to the second terminals of selected ones of said second group of devices and of selected ones of said resistors.

9. A bistable storage element comprising a first group of series connected germanium bars immersed in liquid helium, said bars being easily switched from the conducting to the nonconducting state by reversing the voltage across them, a second group of germanium bars having one terminal of each connected to each junction between the devices of said first group, all of said germanium bars being immersed in liquid helium, a plurality of two-terminal resistors having one terminal of each connected to each of said junctions, and means to apply first, second, and third predetermined patterns of voltages to said second terminals of selected ones of said second group of germanium bars and of selected ones of said resistors to switch said element from one of said stable states to the other said stable states.

References Cited in the file of this patent

UNITED STATES PATENTS 2,907,898 Clark ------------------ Oct. 6, 1959

OTHER REFERENCES

The Cryotron, A Superconductive Computer Component, by D. A. Buck, Proceedings of the I.R.E., vol. 44, No. 4, April 1956.